US008438730B2

(12) United States Patent
Ciminelli

(10) Patent No.: US 8,438,730 B2
(45) Date of Patent: May 14, 2013

(54) METHOD OF PROTECTING PRINTHEAD DIE FACE

(75) Inventor: Mario J. Ciminelli, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 292 days.

(21) Appl. No.: 13/013,842

(22) Filed: Jan. 26, 2011

(65) Prior Publication Data

US 2012/0186079 A1 Jul. 26, 2012

(51) Int. Cl.

| | |
|---|---|
| ***B21D 53/76*** | (2006.01) |
| ***B23P 17/00*** | (2006.01) |
| ***B29C 65/00*** | (2006.01) |
| ***B32B 38/00*** | (2006.01) |
| ***B32B 38/04*** | (2006.01) |
| ***B41J 2/015*** | (2006.01) |

(52) U.S. Cl.
USPC .......................... 29/890.1; 156/273.3; 347/20

(58) Field of Classification Search ................. 29/890.1; 156/273.3; 347/20, 40, 49, 50, 63
See application file for complete search history.

(56) References Cited

U.S. PATENT DOCUMENTS

| | | | | |
|---|---|---|---|---|
| 4,500,895 | A * | 2/1985 | Buck et al. | 347/87 |
| 5,258,781 | A * | 11/1993 | John | 347/63 |
| 5,751,324 | A * | 5/1998 | Brandon et al. | 347/87 |
| 6,206,499 | B1 * | 3/2001 | Iijima et al. | 347/33 |
| 6,325,491 | B1 * | 12/2001 | Feinn | 347/50 |
| 6,659,591 | B2 * | 12/2003 | Sato et al. | 347/50 |
| 6,902,260 | B2 * | 6/2005 | Aschoff et al. | 347/63 |
| 7,018,503 | B2 * | 3/2006 | Murthy et al. | 156/291 |
| 7,350,902 | B2 * | 4/2008 | Dietl et al. | 347/43 |
| 7,600,850 | B2 * | 10/2009 | Blackburn et al. | 347/20 |
| 7,766,455 | B2 * | 8/2010 | Graham et al. | 347/47 |
| 7,862,147 | B2 * | 1/2011 | Ciminelli et al. | 347/40 |
| 2008/0030543 | A1 * | 2/2008 | Heo et al. | 347/40 |
| 2008/0149024 | A1 * | 6/2008 | Petruchik et al. | 118/300 |

* cited by examiner

*Primary Examiner* — David Angwin
(74) *Attorney, Agent, or Firm* — Peyton C. Watkins

(57) ABSTRACT

A method of assembling an inkjet printhead comprising providing a printhead chassis; providing a support surface; affixing a printhead die to a die location portion of the support surface; affixing a portion of an attachment surface of a flexible circuit to the support surface adjacent to the die location portion of the support surface; electrically connecting the printhead die to the flexible circuit; affixing a spacer member to a surface of the flexible circuit that is opposite the attachment surface; applying an encapsulating material in contact with the printhead die, the flexible circuit, and the spacer member; and curing the encapsulating material.

16 Claims, 10 Drawing Sheets

METHOD OF PROTECTING PRINTHEAD DIE FACE

CROSS REFERENCE TO RELATED APPLICATION

Reference is made to commonly assigned, co-pending U.S. patent application Ser. No. 13/013,841, filed concurrently herewith, entitled: "Inkjet Printhead With Protective Spacer", the disclosure of which is incorporated herein.

FIELD OF THE INVENTION

The present invention relates generally to the portion of an inkjet printhead that confronts the recording medium, and more particularly to protecting the face of the printhead against damage if the recording medium strikes the printhead.

BACKGROUND OF THE INVENTION

An inkjet printing system typically includes one or more printheads and their corresponding ink supplies. Each printhead includes an ink inlet that is connected to its ink supply and an array of drop ejectors, each ejector consisting of an ink pressurization chamber, an ejecting actuator and a nozzle through which droplets of ink are ejected. The ejecting actuator may be one of various types, including a heater that vaporizes some of the ink in the pressurization chamber in order to propel a droplet out of the orifice, or a piezoelectric device which changes the wall geometry of the chamber in order to generate a pressure wave that ejects a droplet. The droplets are typically directed toward paper or other recording medium in order to produce an image according to image data that is converted into electronic firing pulses for the drop ejectors as the recording medium is moved relative to the printhead.

Inkjet ink includes a variety of volatile and nonvolatile components including pigments or dyes, humectants, image durability enhancers, and carriers or solvents. A key consideration in ink formulation and ink delivery is the ability to produce high quality images on the print medium. Image quality can be degraded if evaporation of volatile components in the vicinity of the nozzle causes the viscosity to increase too much. The maintenance station of the printer typically includes a cap that surrounds the printhead die nozzle face during periods of nonprinting in order to inhibit evaporation of the volatile components of the ink, and also to provide protection against accumulation of particulates on the nozzle face. The maintenance station also typically includes a wiper for wiping the nozzle face to clean off ink residue and other debris.

A common type of printer architecture is the carriage printer, where the printhead nozzle array is somewhat smaller than the extent of the region of interest for printing on the recording medium and the printhead is mounted on a carriage. In a carriage printer, the recording medium is advanced a given distance along a media advance direction and then stopped. While the recording medium is stopped, the printhead is moved by the carriage in a carriage scan direction that is substantially perpendicular to the media advance direction as the drops are ejected from the nozzles. After the printhead has printed a swath of the image while traversing the recording medium, the recording medium is advanced, the carriage direction of motion is reversed, and the image is formed swath by swath.

In an inkjet printer, the face of the printhead die containing the nozzle array(s) is typically positioned near the recording medium in order to provide improved print quality. Close positioning of the nozzle face of the printhead die to the recording medium keeps the printed dots close to their intended locations, even for angularly misdirected jets. A printed wiring member that brings electrical signals to the printhead die is typically attached adjacent to the printhead die and is electrically interconnected to the printhead die. The electrical interconnections are subsequently encapsulated for protection.

In order to provide the capability of printing across the entire width of the recording medium, and also to allow space for the carriage to decelerate and stop before changing directions to print the next swath, typically the carriage moves the printhead beyond the side edges of the recording medium. Generally the position of the recording medium relative to the printhead nozzle face is fairly well controlled. However, occasionally a sheet of recording medium can have a dog-eared edge. Also occasionally multiple sheets of recording medium can be inadvertently fed at the same time, sometimes resulting in paper jamming and folding in accordion fashion. In such situations, the close proximity of the printhead nozzle face to the nominal position of the recording medium can result in recording medium striking the nozzle face of the die as the carriage moves the printhead past the edge of the recording medium. For nozzle faces made of material that is fragile or brittle, such strikes can cause catastrophic damage to the printhead, requiring its replacement. Several patents including U.S. Pat. Nos. 7,018,503, 6,902,260, 5,751,324, and 4,500,895 disclose mounting the printhead die within a recess in the mounting substrate. Such a recess at the mounting substrate can help protect the printhead die, but can add manufacturing complexities.

Commonly assigned U.S. Pat. No. 7,862,147, incorporated herein in its entirety by reference, discloses providing inclined surfaces near the printhead die to protect the nozzle face from damaging impact by recording medium. The printed wiring member attached adjacent to the printhead die is typically a flexible circuit that is thinner than printhead die. An embodiment is described in U.S. Pat. No. 7,862,147 where a shim is provided underneath the flexible circuit to bring the surface of the flexible circuit to a similar height as the nozzle face of the printhead die and the tops of the inclined surfaces. This provides further protection, as well as improved maintainability of the printhead. When maintaining the nozzle face in the printer, a wiper is used to wipe excess ink and other debris off the nozzle face as well as off the flexible circuit that is typically used as a capping surface for the maintenance station cap to seal against. Shimming the flexible circuit so that it is at a similar height as the nozzle face allows the wiper blade to wipe flexible circuit as well as the nozzle face.

A similar raising of the height of the wiring member relative to nozzle face of the printhead die is described in U.S. Pat. No. 6,659,591, where a ceramic plate is used to raise the electrical wiring member so that electrical connections between the electrical wiring member and the printhead die can be done in a planar manner. This is appropriate if tape automated bonding is used to connect electrical traces that cantilever beyond the edge of the electrical wiring member, as in U.S. Pat. No. 6,659,591. However, if wire bonding is used to electrically interconnect the wiring member and the printhead die, the wire loops can extend to a height above the nozzle face surface such that after the wire bonds are encapsulated, the encapsulation can interfere with wiping, and can also prevent the positioning of the printhead nozzle face as close to the nominal position of the recording medium as would otherwise be desired. In addition, the encapsulant material, which is applied as a liquid, is relatively unconstrained in this arrangement and flow of the encapsulant needs to be carefully controlled.

What is needed is a configuration of the printhead that provides protection for the printhead die, a lower encapsulant height where wire bonding is used to provide electrical interconnection between the printhead die and the flexible circuit, a more well-controlled flow of the encapsulant material, and a capping surface that can be readily wiped at the same time as the printhead nozzle face.

SUMMARY OF THE INVENTION

The present invention is directed to overcoming one or more of the problems set forth above. Briefly summarized, according to one aspect of the invention, the invention resides in a method of assembling an inkjet printhead comprising providing a printhead chassis; providing a support surface; affixing a printhead die to a die location portion of the support surface; affixing a portion of an attachment surface of a flexible circuit to the support surface adjacent to the die location portion of the support surface; electrically connecting the printhead die to the flexible circuit; affixing a spacer member to a surface of the flexible circuit that is opposite the attachment surface; applying an encapsulating material in contact with the printhead die, the flexible circuit, and the spacer member; and curing the encapsulating material.

DETAILED DESCRIPTION OF THE INVENTION

Figure 1:
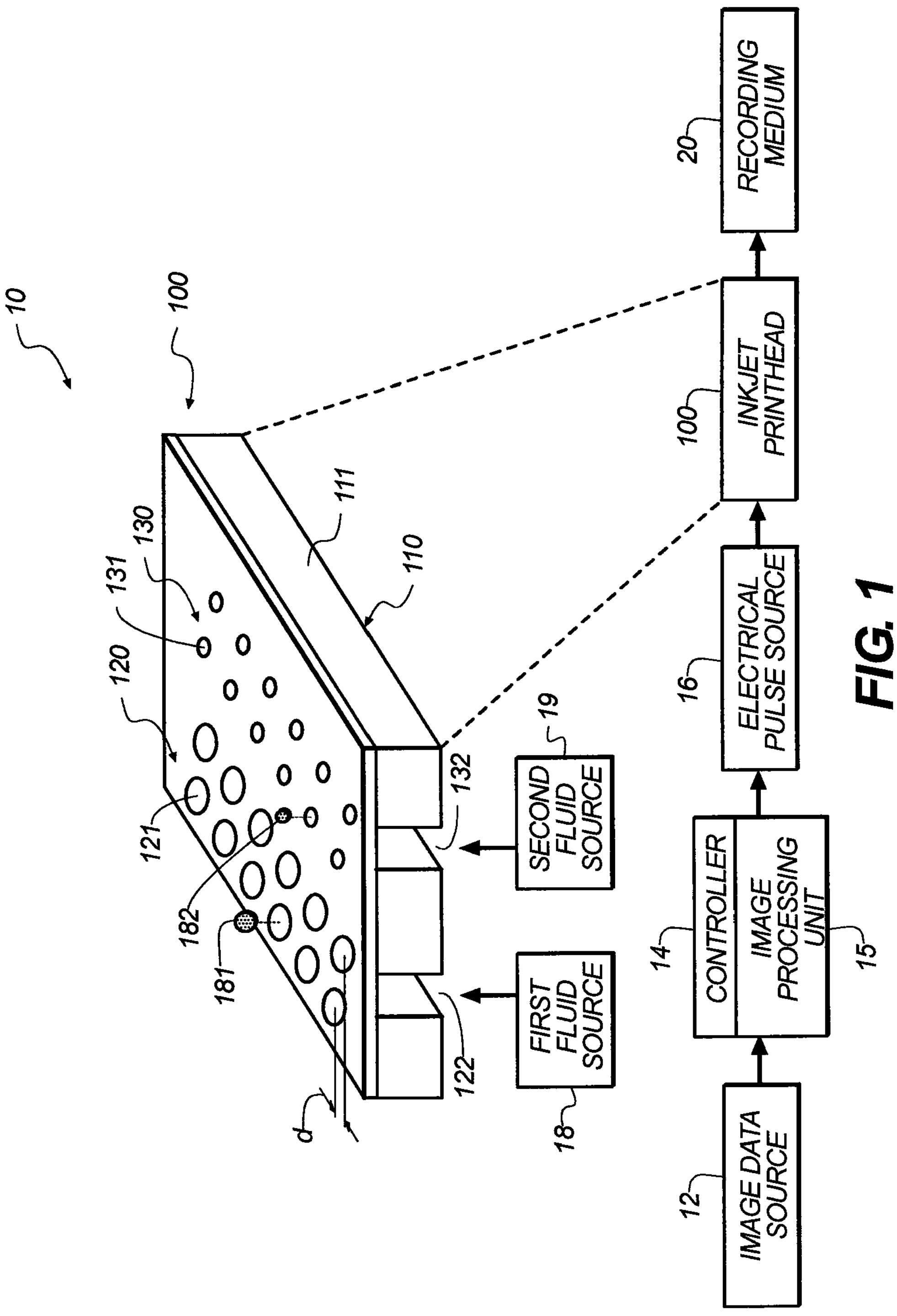
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays disposed at a surface of inkjet printhead die 110. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. d=1/1200 inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. The printhead die are arranged on a support member as discussed below relative to FIG. 2. In FIG. 1, first ink source 18 supplies ink to first nozzle array 120 via ink delivery pathway 122, and second ink source 19 supplies ink to second nozzle array 130 via ink delivery pathway 132. Although distinct ink sources 18 and 19 are shown, in some applications it may be beneficial to have a single ink source supplying ink to both the first nozzle array 120 and the second nozzle array 130 via ink delivery pathways 122 and 132 respectively. Also, in some embodiments, fewer than two or more than two nozzle arrays can be included on printhead die 110. In some embodiments, all nozzles on inkjet printhead die 110 can be the same size, rather than having multiple sized nozzles on inkjet printhead die 110.

The drop forming mechanisms associated with the nozzles are not shown in FIG. 1. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
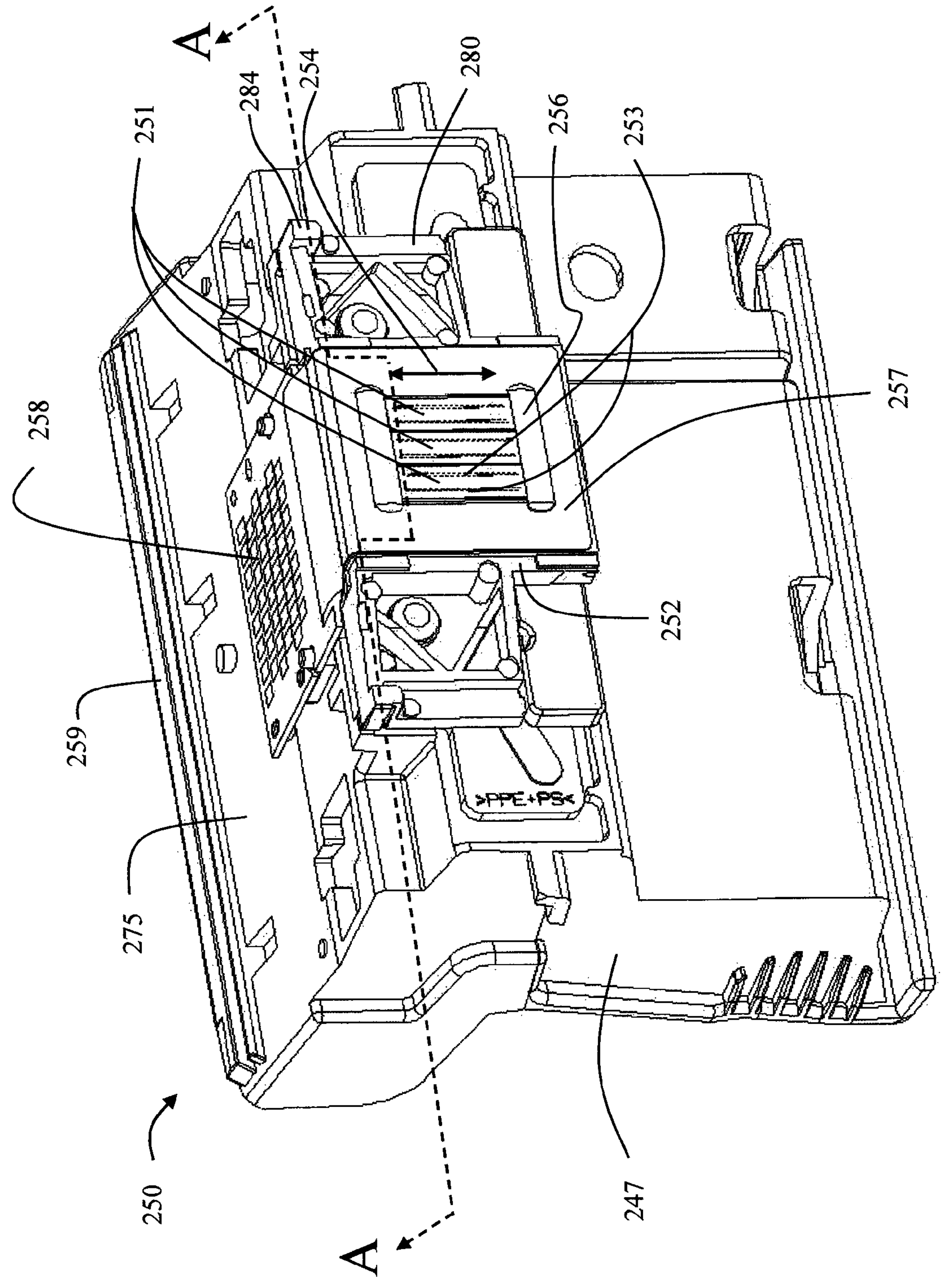
FIG. 2 Prior Art
FIG. 2 is a perspective view of a portion of a prior art printhead.

FIG. 2 shows a perspective view of a portion of a prior art printhead 250, which is an example of an inkjet printhead 100. Printhead 250 includes three printhead die 251 (similar to printhead die 110 in FIG. 1) that are affixed to mounting substrate 252, which is part of a mounting assembly 280 attached to printhead chassis 247. Mounting assembly 280 includes alignment features 284 to facilitate accurate positioning of the printhead 250 in the printer. The surface of the mounting substrate 252 to which the printhead die 250 are bonded is also called a support surface 255 of the printhead. Each printhead die 251 contains two nozzle arrays 253, so that printhead 250 contains six nozzle arrays 253 altogether. The six nozzle arrays 253 in this example are each to be connected to ink sources (not shown in FIG. 2), such as cyan, magenta, yellow, text black, photo black, and protective fluid. Each of the six nozzle arrays 253 is disposed along nozzle array direction 254, and the length of each nozzle array along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead 250 across the recording medium 20. Following the printing of a swath, the recording medium 20 is advanced along a media advance direction that is substantially parallel to nozzle array direction 254.

Also shown in FIG. 2 is a flexible circuit 257 to which the printhead die 251 are electrically interconnected, for example, by wire bonding or TAB bonding. Flexible circuit 257 is also adhered to mounting substrate 252, and surrounds the printhead die 250. The interconnections are covered by an encapsulant 256 to protect them. Flexible circuit 257 bends around the side of printhead 250 and connects to connector board 258 on rear wall 275. When printhead 250 is mounted into the carriage 200 (see FIG. 3), connector board 258 is electrically connected to a connector on the carriage 200, so that electrical signals can be transmitted to the printhead die 251.

Figure 3:
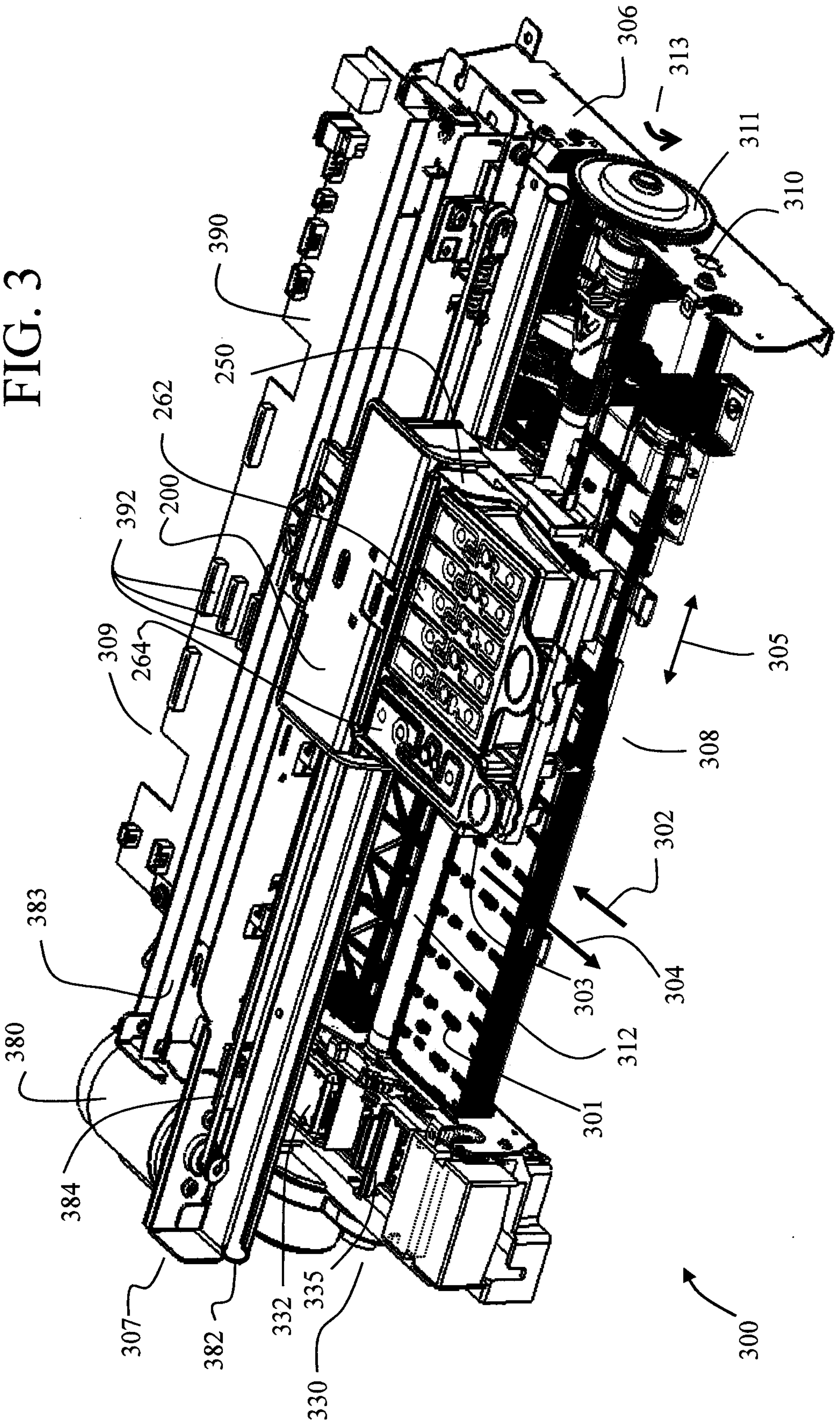
FIG. 3 is a perspective view of a portion of a carriage printer.

FIG. 3 shows a portion of a desktop carriage printer. Some of the parts of the printer have been hidden in the view shown in FIG. 3 so that other parts can be more clearly seen. Printer chassis 300 has a platen 301 in print region 303 across which carriage 200 is moved back and forth in carriage scan direction 305 between the right side 306 and the left side 307 of printer chassis 300, while drops are ejected from printhead die 251 (not shown in FIG. 3) on printhead 250 that is mounted on carriage 200. Paper or other recording medium is held substantially flat against platen 301, although sometimes an edge of the recording medium lifts away from platen 301. Carriage motor 380 moves belt 384 to move carriage 200 along carriage guide rail 382. An encoder sensor (not shown) is mounted on carriage 200 and indicates carriage location relative to an encoder fence 383.

The mounting orientation of printhead 250 is rotated relative to the view in FIG. 2, so that the printhead die 251 are located at the bottom side of printhead 250, the droplets of ink being ejected downward onto the recording medium in print region 303 in the view of FIG. 3. Multi-chamber ink tank 262, in this example, contains five ink sources: cyan, magenta, yellow, photo black and colorless protective fluid; while single-chamber ink tank 264 contains the ink source for text black. Ink tanks 262 and 264 can include electrical contacts (not shown) for data storage devices, for example, to track ink usage. In other arrangements, rather than having a multi-chamber ink tank to hold several ink sources, all ink sources are held in individual single chamber ink tanks. Paper or other recording medium (sometimes generically referred to as paper or media herein) is loaded along paper load entry direction 302 toward the front of printer chassis 308.

Figure 4:
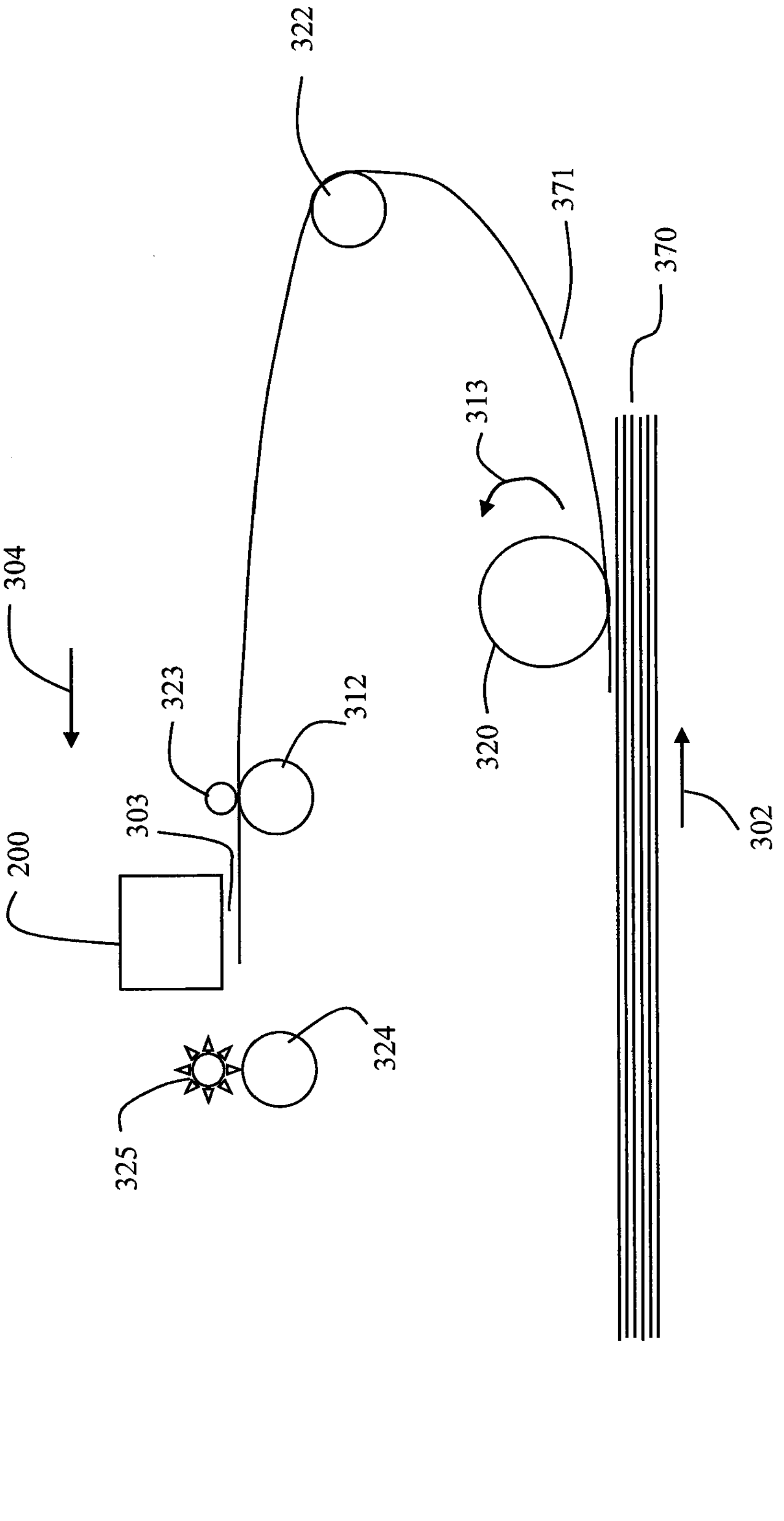
FIG. 4 is a schematic side view of an exemplary paper path in a carriage printer.

A variety of rollers are used to advance the medium through the printer as shown schematically in the side view of FIG. 4. In this example, a pick-up roller 320 moves the top piece or sheet 371 of a stack 370 of paper or other recording medium in the direction of arrow, paper load entry direction 302. A turn roller 322 acts to move the paper around a C-shaped path (in cooperation with a curved rear wall surface) so that the paper continues to advance along media advance direction 304 from the rear 309 of the printer chassis (with reference also to FIG. 3). The paper is then moved by feed roller 312 and idler roller(s) 323 to advance across print region 303 (platen not shown), and from there to a discharge roller 324 and star wheel(s) 325 so that printed paper exits along media advance direction 304. Feed roller 312 includes a feed roller shaft along its axis, and feed roller gear 311 is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 3, but the hole 310 at the right side of the printer chassis 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printer chassis 307, in the example of FIG. 3, is the maintenance station 330 including a cap 332 and a wiper 335.

Toward the rear of the printer chassis 309, in this example, is located the electronics board 390, which includes cable connectors 392 for communicating via cables (not shown) to the printhead carriage 200 and from there to the printhead 250. Also on the electronics board are typically mounted motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Figure 5:
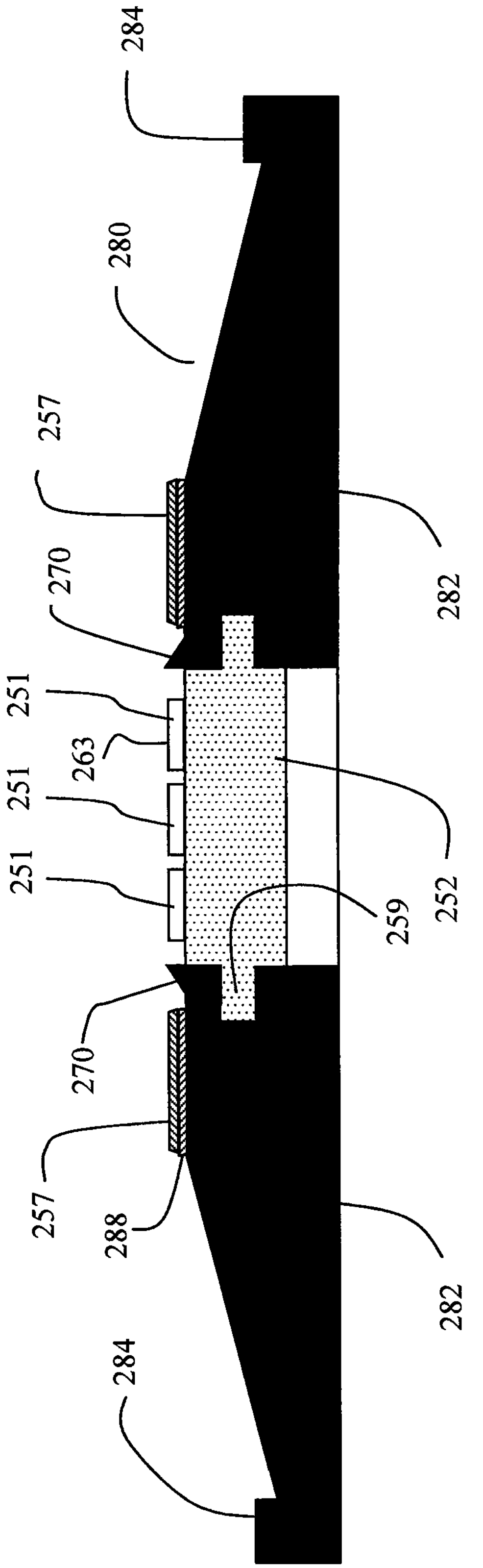
FIG. 5 Prior Art
FIG. 5 is a perspective view of a prior art mounting assembly for a printhead.
Figure 10:
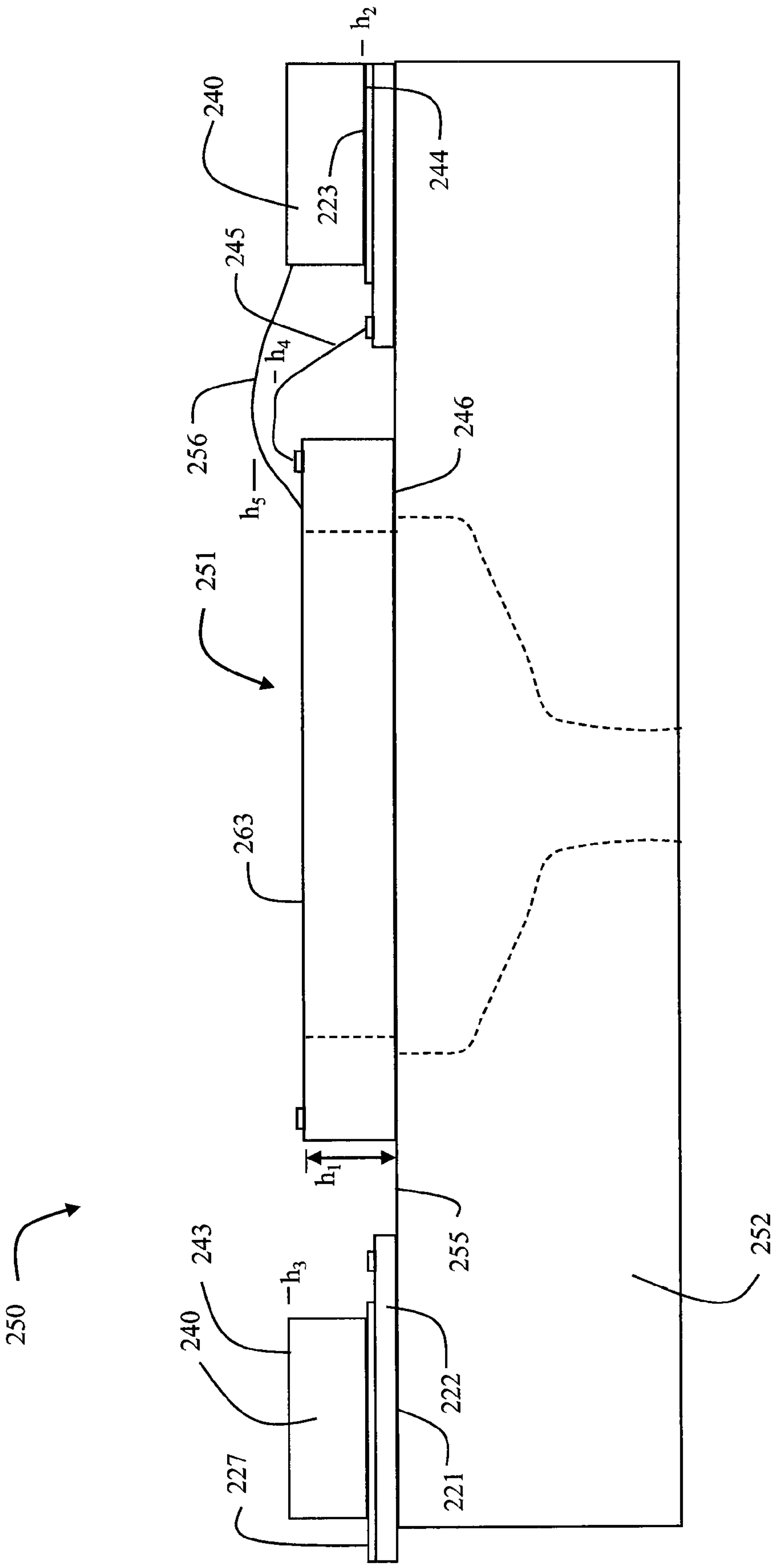
FIG. 10 is similar to FIG. 9, but also showing height relationships of various features with reference to the support surface for the printhead die.

FIG. 5 shows a cross-sectional view of prior art mounting assembly 280 (see FIG. 10 of U.S. Pat. No. 7,862,147) that can be used in place of the mounting assembly 280 of prior art printhead 250 in FIG. 2. The cross-sectional view is in the region indicated by A-A in FIG. 2, although the features in FIG. 5 (such as inclined surfaces 270 and shim 288) are not all present in FIG. 2. In this arrangement, mounting substrate 252 has been insert molded together with extended portion 282 of mounting assembly 280. Mounting substrate 252 includes an outer rim 259 that helps secure the mounting substrate 252 to the molded plastic of mounting assembly 280. Extended portion 282 includes alignment features 284. Inclined surfaces 270 are adjacent the edge of the mounting substrate 252. Printhead die 251 are attached to mounting substrate 252. Flexible circuit 257 is located outside the inclined surfaces 270. In order to provide flexibility, flexible circuit 257 has a thickness on the order of 0.1 mm. Printhead die 251 have a thickness on the order of 0.4 mm. In the arrangement of FIG. 5, a shim 288 having a thickness of about 0.3 to 0.4 mm is provided below flexible circuit 257 to position the upper surface of flexible circuit 257 at about the same height or a bit above the nozzle face 263 of printhead die 251. As discussed in the background above (see also FIG. 2), if wire bonding is used for electrical interconnection between the flexible circuit 257 and the printhead die 250, a disadvantage of having the upper surface of the flexible circuit 257 at about the same height or higher than the nozzle face 263 of printhead die 251, is that wire bond loop height will be excessively high, as will be the height of the encapsulant 256.

Figure 6:
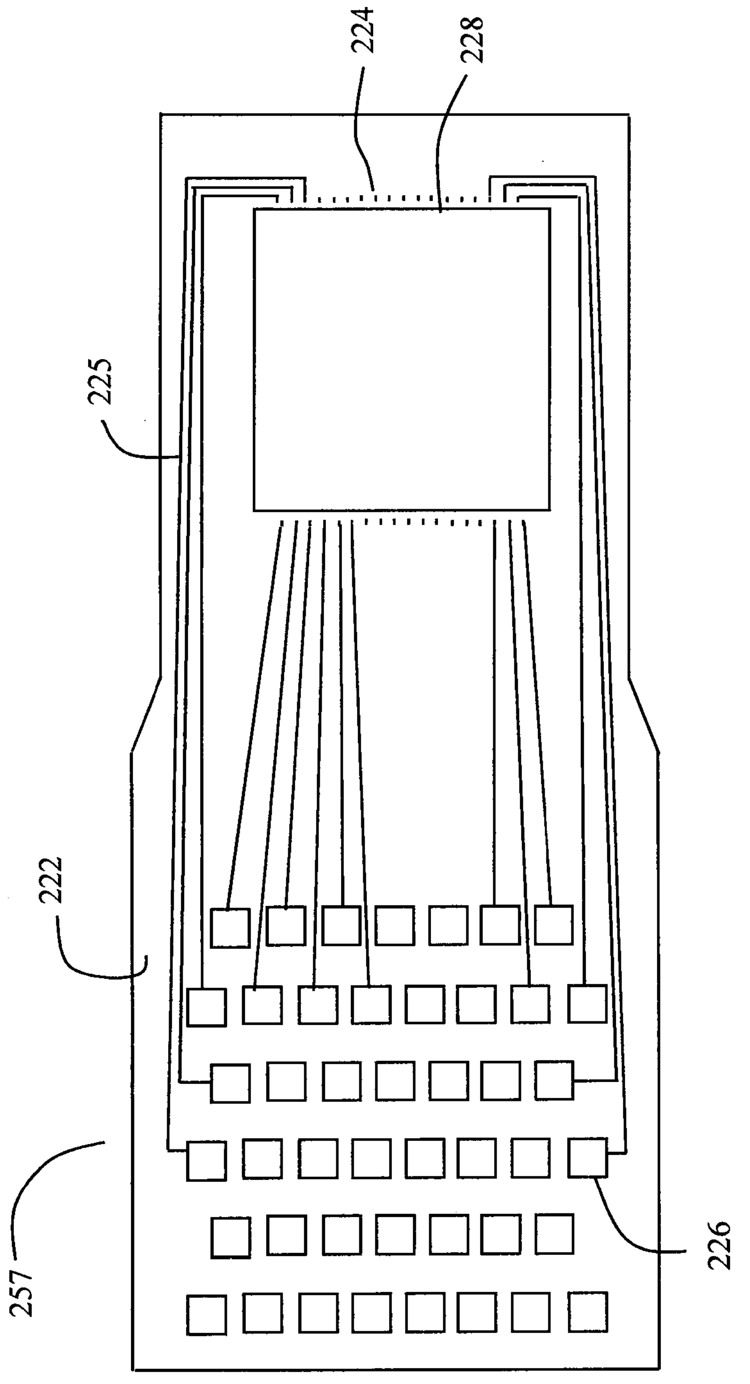
FIG. 6 is a top view of a flexible circuit including an opening.

FIG. 6 shows a top view of the flexible circuit 257 of the present invention before it has been attached to printhead 250. In the arrangement of FIG. 6, the connector board 258 of FIG. 2 has been incorporated into the flexible circuit 257 rather than being a discrete part. Wiring portions including a plurality of leads 225, as well as a corresponding plurality of contact pads 224 and connector pads 226, have been patterned in a copper layer on a flexible base layer 222 such as polyimide. A nickel layer is typically plated over the copper, and a gold layer is typically plated over the nickel, particularly at the contact pads 224 (for good wire bondability) and at the connector pads 224 (for reliable connection to the connector at the carriage). An opening 228 has been provided within flexible circuit 257 to surround the printhead die 251.

Figure 7:
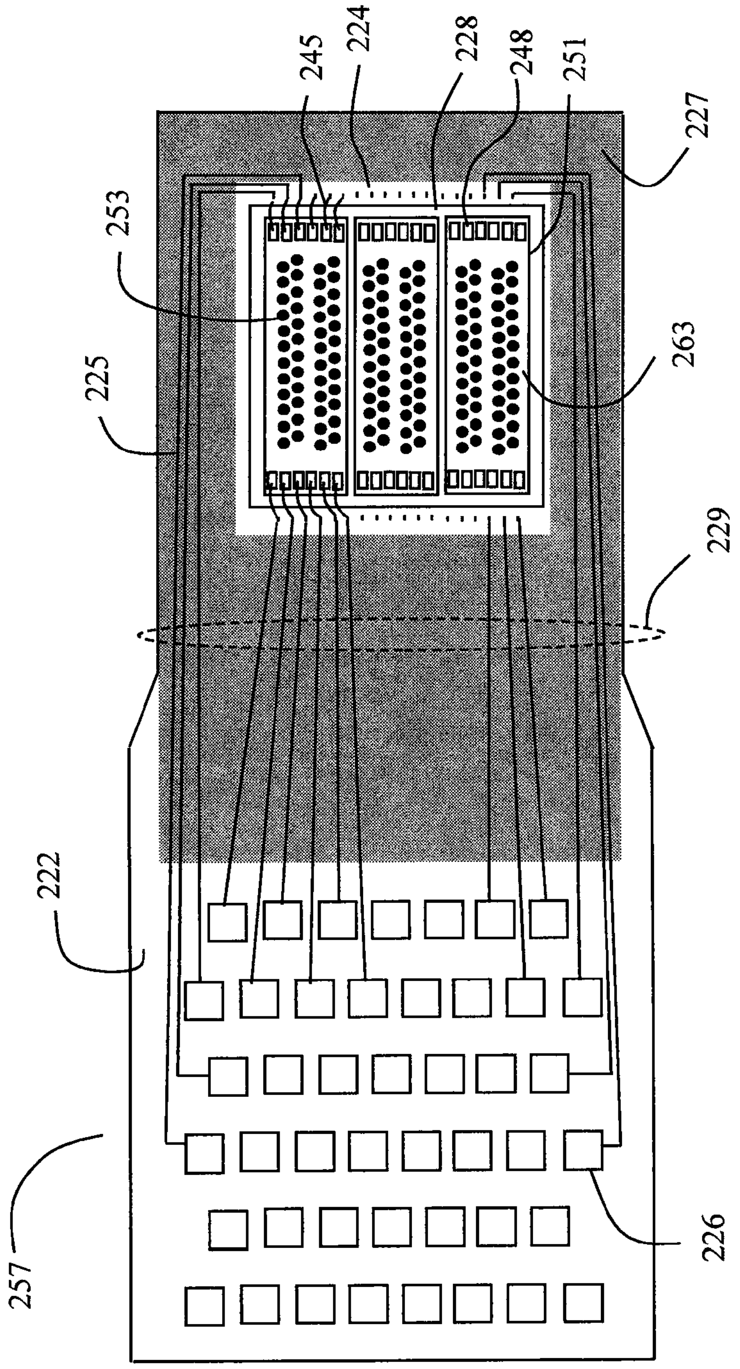
FIG. 7 is a top view of the flexible circuit of FIG. 6, also showing a cover layer on the flexible circuit, as well as a plurality of printhead die within the opening.

FIG. 7 shows a top view of flexible circuit 257 with three printhead die 251 located within opening 228. Nozzle arrays 253 and a plurality of bond pads 248 are shown on nozzle face 263. Wire bonds 245 are shown for the uppermost printhead die in FIG. 7 between the bond pads 248 and corresponding contact pads 226 on the flexible circuit 257. A cover layer 227 is shown as a translucent gray shaded region. Cover layer 227 is typically laminated over the leads prior to gold plating, so that the expensive gold material is only deposited where needed. Cover layer 227 is typically thin (on the order of 0.03 mm). The entire thickness of flexible circuit 257 is on the order of 0.1 mm, so that it is readily bent in bend region 229 (see also FIG. 2 with regard to flexible circuit 257 bending around an edge of printhead 250). For a thin polyimide cover layer 227, leads 225 can typically be seen through the cover layer 227 (as indicated in FIG. 7). Cover layer 227 also provides protection of leads 225 against ink, against inadvertent shorting and/or against mechanical damage. In some arrangements, cover layer 227 extends all the way into the region of the connector pads 226. In such arrangements, cover layer 227 does not cover connector pads 226, but surrounds each one.

Figure 8:
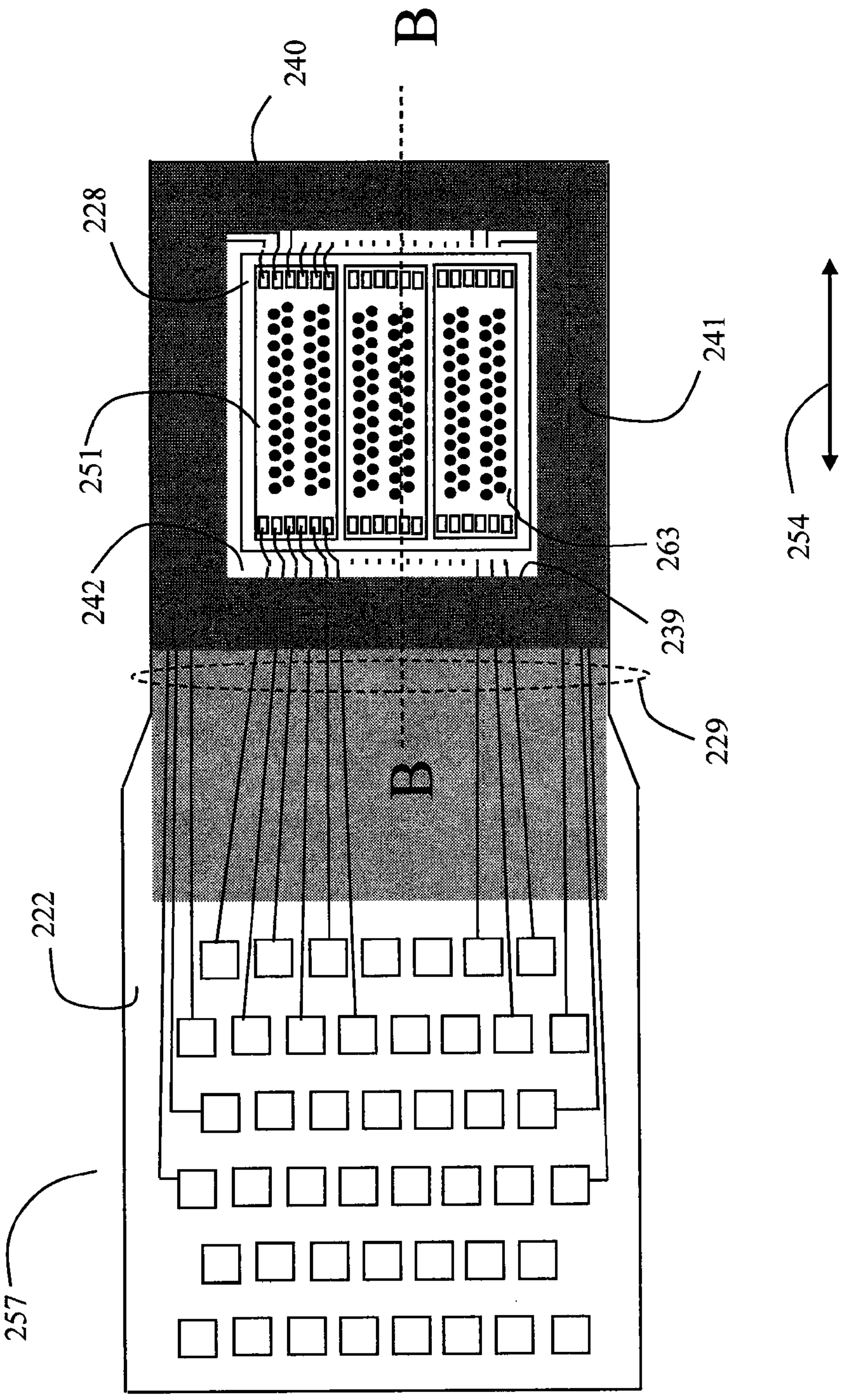
FIG. 8 is a top view of the flexible circuit of FIG. 7, also showing a spacer affixed to the cover layer, according to an embodiment of the invention.

FIG. 8 shows a spacer 240 affixed to flexible circuit 257 according to an embodiment of the present invention. The arrangement shown in FIG. 8 can be incorporated into a printhead such as that shown in FIG. 2 in order to achieve the advantages described below. Spacer 240 has the shape of a frame 241 surrounding a hole 242. Printhead die 251 are disposed within hole 242 of frame 241 of spacer 240. Unlike shim 288 of prior art mounting assembly 280 shown in FIG. 5, spacer 240 is positioned above flexible circuit 257 rather than below it, as will be made more clear below. Spacer 240 has a thickness sufficient to bring the top surface of the spacer substantially coplanar with, or a bit above, the nozzle face 263 of the printhead die 251. If the printhead die has a thickness of about 0.4 mm, and the flexible circuit 257 including cover layer 227 has a thickness of about 0.1 mm, then spacer 240 will have a thickness of approximately 0.3 mm to 0.4 mm. Spacer 240 is not necessarily opaque, but is shown darker than cover layer 227 in order to suggest a greater thickness. In the arrangement shown in FIG. 8, no portion of spacer 240 extends into the bend region 229. The sequence of FIGS. 6-8 is meant to show the different features of the flexible circuit 257 and the printhead die 251 in relationship to one another. The sequence of figures does not imply a fabrication sequence. For example, it is possible to fabricate the flexible circuit 257, the cover layer 227, and the spacer 240 as one component, and then bond this component, together with the printhead die 251 to the mounting substrate (not shown).

Figure 9:
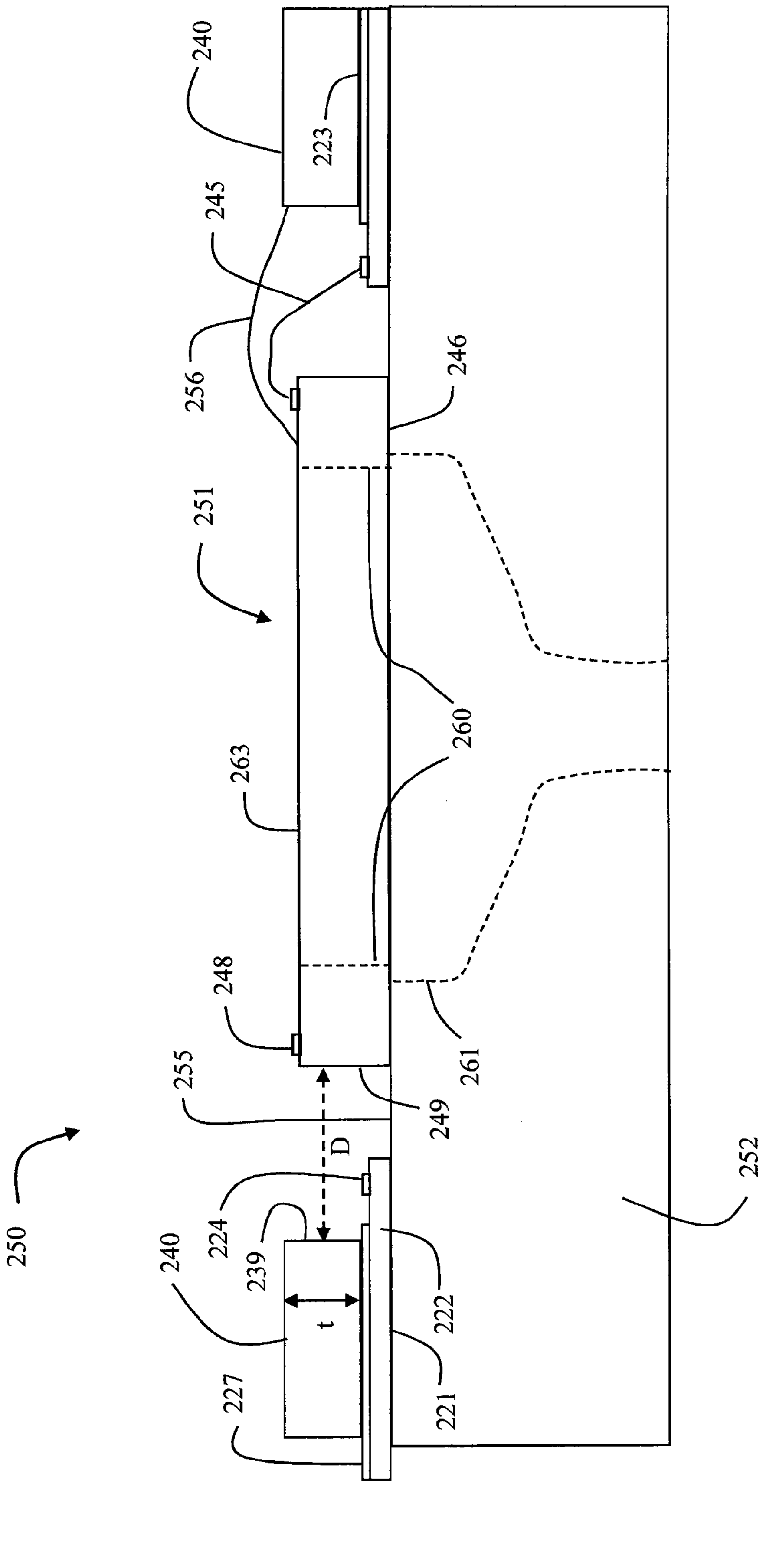
FIG. 9 is a cross-sectional view of a portion of the assembly shown in FIG. 8.

FIG. 9 is a close-up cross-sectional view of a portion of printhead 250 along B-B of FIG. 8. FIG. 9 can be a portion of a mounting assembly 280 similar to that of prior art FIG. 5, but with no inclined surfaces 270, and with a spacer 240 over the flexible circuit 257, rather than a shim 288 below the flexible circuit 288. With reference also to FIGS. 7 and 8, inkjet printhead 250 includes a printhead die 251 having at least one nozzle array 253 and a plurality of bond pads 248 disposed on the surface that is nozzle face 263. Printhead die 251 is affixed to support surface 255 of mounting substrate 252. A portion of flexible circuit 257 is attached adjacent to printhead die 251, for example to support surface 255 of mounting substrate 252. Flexible circuit 257 includes a flexible base layer 222 including an attachment surface 221 for attaching flexible circuit 257 to support surface 255. A plurality of leads 225 and corresponding contact pads 224 are disposed on flexible base layer 222. Optionally, a cover layer 227 covers a portion of the leads 225. Opposite the attachment surface 221 of flexible base layer 222 is a first surface 223 to which spacer 240 is affixed. For arrangements where there is a cover layer 227 on flexible circuit 257 (as in FIGS. 8-9), first surface 223 to which spacer member 240 is affixed is the top of cover layer 227. A plurality of wire bonds 245 provide electrical interconnection between bond pads 248 on printhead die 251 and corresponding contact pads 224 of the flexible circuit 257. An encapsulating material is deposited over wire bonds 245 to form an encapsulant 256 that is in contact with the nozzle face 263 of the printhead die, the plurality of bond pads 248 of the printhead die, the plurality of contact pads 224 of the flexible circuit 257 and spacer member 240.

Printhead die 251 includes an edge 249 that is located near an internal edge 239 of spacer 240 (i.e. an edge 239 of the frame 241 adjacent hole 242 with reference to FIG. 8). As can be understood with reference to FIG. 9, a distance D between edge 249 of printhead die 251 and edge 239 of spacer 240 needs to be greater than the distance between edge 249 and contact pad 224, so that wire bonds 245 can be provided between bond pads 248 and contact pads 224. By contrast, in the prior art configuration of FIG. 5, the distance between shim 288 and the edge of the printhead die 251 is less than the distance between the distance between the contact pad and the edge of the printhead die. The advantage of a larger gap (as measured by distance D in the arrangement of FIG. 9) between the edge 249 of printhead die 251 and edge 239 of spacer 240, is that the larger gap facilitates the flow of encapsulating material, so that the encapsulant 256 is less likely to include entrapped air that can give rise to unwanted encapsulation voids. For example, the distance D from edge 239 of spacer 240 to edge 249 of printhead die 251 is preferably greater than the thickness t of spacer member 240.

As shown in FIG. 9, printhead die includes a die bond surface 246 opposite the nozzle face surface 263. Die bond surface includes an ink feed opening 260 that is fluidically connected to nozzle array 253. Nozzles of nozzle array 253 are typically staggered on opposite sides of ink feed opening 260 along nozzle array direction 254, as shown also in FIGS. 1 and 8. Support surface 255 of mounting substrate 252 includes an ink passageway 261 that is fluidically connected to ink feed opening 260 in order to provide ink.

Relative heights of the different features are shown in FIG. 10. All of the heights h in FIG. 10 are with reference to support surface 255, although only $h_1$ (the height of the nozzle face surface 263 of printhead die 251 above support surface 255) has a double sided arrow indicating that support surface 255 is the reference surface. As shown, height $h_1$ of the nozzle face surface 263 is greater than height $h_2$ of the first surface 223 (e.g. the top of cover layer 227) of flexible circuit 257. Height $h_3$ of first surface 243 of spacer 240 (the first surface being opposite a second surface 244 of spacer 240 that is attached to first surface 223 of flexible circuit 257) is greater than height $h_1$ of the nozzle face surface 263 in order to provide protection for the nozzle face surface 263 from media strikes in this arrangement. First surface 243 of spacer 240 is configured to deflect edges of recording medium that are raised relative to platen 301 (see FIG. 3) away from the nozzle face 263 of printhead die 251. Height $h_4$ of wire bonds 245 is greater than the height of nozzle face 263. However, because the contact pads 224 on flexible circuit 257 are at a lower height, height $h_4$ of the wire bonds 245 is less than if the contact pads 224 were coplanar with the nozzle face surface 263, as they would be in the prior art configuration shown in FIG. 5. As a result, height $h_5$ of the encapsulant 256, though it is higher than height $h_4$ of the wire bonds 245, in order to provide protection, is less high than it would be in the prior art configuration of FIG. 5. Such a lower height $h_5$ provides an advantage for maintainability in the printer 300 when wiper 335 (see FIG. 3) wipes across first surface 243 of spacer 240, nozzle face surface 263 of printhead die 251, and encapsulant 256. Wiper 335 is made of a compliant elastomeric material to allow it to conform to some variation in height, but keeping the height differences small for these three features is preferable. Because cap 332 of maintenance station 330 (FIG. 3) is configured to contact first surface 243 of spacer 240 at frame 241 (see also FIG. 8) when inkjet printhead 250 is parked at maintenance station 330, it is important for wiper 335 to contact and wipe frame 241 when wiping away ink residue and other debris.

Having described the features of the printhead 250, we will next describe a method of assembly. Although the portion of FIG. 2 near the flexible circuit 257 is modified in the present invention, other components such as printhead chassis 247 and printhead die 251 are similar to FIG. 2 in the present invention. The method will be described with reference to FIGS. 2, and 7-10. A printhead chassis 247 is provided, for example by injection molding. A support surface 255 is provided by molding, or by affixing a mounting substrate 252 to the printhead chassis 247. Mounting substrate 252 can be affixed to printhead chassis by insert molding it into a mounting assembly 280, and then attaching mounting assembly 280 to printhead chassis 247 using bolts. One or more printhead die 251 are attached to a die location portion of support surface 255, such that an ink feed opening 260 is fluidically connected to an ink passageway 261 of support surface 255. A portion of attachment surface 221 of flexible circuit 257 is attached to support surface 255 adjacent to the die location portion of the support surface 255. This portion of the flexible circuit 257 can be attached to support surface 255 either prior to or subsequent to the printhead die 251 being attached to support surface 255. Bond pads 248 on printhead die 251 are electrically connected to contact pads 224 located on a contact layer (e.g. flexible base layer 222) of flexible circuit 257, for example by wire bonding. Optionally a cover layer 227 covers a portion of the contact layer. A spacer member 240 is affixed to a surface 223 (for example, cover layer 227) that is opposite the attachment surface 221 of flexible circuit 257. Affixing the spacer member 240 can be done prior to or subsequent to attaching the printhead die 251 to support surface 255. An encapsulating material is deposited in contact with printhead die 251, flexible circuit 257 and spacer member 240, and is subsequently cured. An edge 239 of spacer member 240 is offset from an edge 249 of printhead die 251 by a gap, and the encapsulating material is deposited within the gap to cover over the wire bonds 245, as well as over the bond pads 248 on the nozzle face 263 of printhead die 251. Lateral flow of the encapsulating material is restricted by the edge 239 of spacer member 240. The bond pads 248 are on a surface of printhead die 251 that is located at a first distance from support surface 255, while contact pads 224 are located at a second distance from support surface 255 (less than the first distance). Because it is undesirable for the wire bonds 245 to contact the printhead die 251 other than at the corresponding bond pads 248, a wire loop is formed including a first end bonded to a bond pad 248, a second end bonded to a contact pad 224, and a loop portion located at a third distance from the support surface, where the third distance is greater than the first distance. In other words the loop portion is higher than the nozzle face surface 263. However, the distance between the third distance and the first distance is typically less than 0.2 mm, so that the wire bond height and the subsequent height of encapsulant 256 can be a small distance above nozzle face 263. For printhead die 251 having bond pads 248 at two opposite ends (as shown in FIGS. 7 and 8), it can be advantageous for the flexible circuit 257 to have an opening 228, such that the one or more printhead die 251 are affixed to support surface 255 within the opening 228 of the flexible circuit 257. In order to provide a continuous capping surface around the one or more printhead die 251, spacer member 240 typically includes a frame 241 around a hole 242, and the printhead die 251 are affixed to support surface 255 within the hole 242 in the frame 241 of spacer member 240.

A reason why flexible circuit 257 is made to be flexible is that it can be advantageous to locate connector pads 226 on a second side surface of printhead chassis 247 than the support surface 255 is located on. The second side surface is disposed at an angle to support surface 255. Therefore, flexible circuit 257 is bent at bend region 229 and the portion of flexible circuit 257 that includes connector pads 226 is attached to the second side surface. Bend region 229 can include cover layer 227, but would typically not include spacer 240, because of the greater thickness of spacer 240.

In summary, the invention includes a method of assembling an inkjet printhead comprising providing a printhead chassis; providing a support surface; affixing a printhead die to a die location portion of the support surface; affixing a portion of an attachment surface of a flexible circuit to the support surface adjacent to the die location portion of the support surface; electrically connecting the printhead die to the flexible circuit; affixing a spacer member to a surface of the flexible circuit that is opposite the attachment surface; applying an encapsulating material in contact with the printhead die, the flexible circuit, and the spacer member; and curing the encapsulating material.

Advantages of the invention include (but may not be limited to) the following: a) protection is provided for the printhead die nozzle face against media strikes; b) a lower encapsulant height is provided for wire bonds used to provide electrical interconnection between the printhead die and the flexible circuit; c) a more well-controlled flow of the encapsulant material is facilitated by the wider gap between the edge of the spacer member and the edge of the printhead die, as well as by the constraining of lateral flow; and d) a capping surface is provided that can be readily wiped at the same time as the printhead nozzle face.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First ink source
19 Second ink source
20 Recording medium
100 Inkjet printhead
110 Inkjet printhead die
111 Substrate
120 First nozzle array

121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
221 Attachment surface
222 Flexible base layer
223 First surface (of flexible circuit)
224 Contact pads
225 Leads
226 Connector pads
227 Cover layer
228 Opening
229 Bend region
239 Edge (of spacer)
240 Spacer
241 Frame
242 Hole
243 First surface (of spacer)
244 Second surface (of spacer)
245 Wire bond
246 Die bond surface
247 Printhead chassis
248 Bond pads
249 Edge (of printhead die)
250 Printhead
251 Printhead die
252 Mounting substrate
253 Nozzle array
254 Nozzle array direction
255 Support surface
256 Encapsulant
257 Flexible circuit
258 Connector board
259 Outer rim (of mounting substrate)
260 Ink feed opening
261 Ink passageway
262 Multichamber ink tank
263 Nozzle face
264 Single chamber ink tank
270 Inclined surface(s) (prior art)
275 Rear wall (of printhead)
280 Mounting assembly
282 Extended portion (of mounting assembly)
284 Alignment features
288 Shim under flexible circuit
300 Printer chassis
301 Platen
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
322 Turn roller
323 Idler roller
324 Discharge roller
325 Star wheel(s)
330 Maintenance station
332 Cap
335 Wiper
370 Stack of media
371 Top piece of medium
380 Carriage motor
382 Carriage guide rail
383 Encoder fence
384 Belt
390 Printer electronics board
392 Cable connectors

The invention claimed is:

1. A method of assembling an inkjet printhead comprising:
providing a printhead chassis;
providing a support surface;
affixing a printhead die to a die location portion of the support surface;
affixing a portion of an attachment surface of a flexible circuit to the support surface adjacent to the die location portion of the support surface;
electrically connecting the printhead die to the flexible circuit;
affixing a spacer member to a surface of the flexible circuit that is opposite the attachment surface;
applying an encapsulating material in contact with the printhead die, the flexible circuit, and the spacer member; and
curing the encapsulating material.

2. The method according to claim 1, wherein the step of providing a support surface comprises molding the support surface.

3. The method according to claim 1, the support surface being part of a mounting substrate, wherein the step of providing a support surface comprises affixing the mounting substrate to the printhead chassis.

4. The method according to claim 1, the support surface being part of a mounting substrate, wherein the step of providing a support surface comprises insert molding the mounting substrate.

5. The method according to claim 1, the printhead die including an ink feed opening fluidically connected to an array of nozzles, and the support surface including an ink passageway, wherein the step of affixing a printhead die to the support surface comprises fluidically connecting the ink feed opening of the printhead die to the ink passageway of the support surface.

6. The method according to claim 1, wherein the step of electrically connecting the printhead die to the flexible circuit comprises wire bonding between bond pads on the printhead die and contact pads on the flexible circuit.

7. The method according to claim 6, the contact pads of the flexible circuit being disposed on a contact layer, a portion of said contact layer being covered by a cover layer, wherein the step of affixing the spacer member to a surface of the flexible circuit further comprises adhering the spacer member to the cover layer of the flexible circuit, such that an edge of the spacer member is offset from an edge of the printhead die by a gap.

8. The method according to claim 7, wherein the step of applying the encapsulating material further comprises dispensing the encapsulating material within the gap over the wire bonds.

9. The method according to claim 8, wherein step of applying the encapsulating material further comprises dispensing the encapsulating material until it covers the wire bonds between the printhead die and the flexible circuit.

10. The method according to claim 9, wherein the step of applying the encapsulating material further comprises restricting lateral flow of the encapsulating material by the edge of the spacer member.

11. The method according to claim 6, the bond pads being disposed on a surface of the printhead die located at a first distance from the support surface, and the contact pads on the flexible circuit being disposed on a contact layer of the flexible circuit located at a second distance from the support surface, the second distance being less than the first distance, wherein the step of wire bonding includes forming a wire loop including a first end bonded to a bond pad, a second end bonded to a contact pad, and a loop portion located at a third distance from the support surface, the third distance being greater than the first distance.

12. The method according to claim 11 wherein the difference between the third distance and the first distance is less than 0.2 mm.

13. The method according to claim 1, the printhead chassis further including a side surface disposed at an angle to the support surface, the method further including bending the flexible circuit and attaching another portion of the flexible circuit to the side surface of the printhead chassis.

14. The method according to claim 1, wherein the step of affixing a printhead die to the support surface includes affixing a plurality of printhead die to the support surface.

15. The method according to claim 14, the flexible circuit including an opening, wherein the plurality of printhead die are affixed to the support surface within the opening of the flexible circuit.

16. The method according to claim 15, the spacer member including a frame around a hole, wherein the plurality of printhead die are affixed to the support surface within the hole in the frame of the spacer member.

* * * * *